US011009299B2

(12) United States Patent
Chopard et al.

(10) Patent No.: US 11,009,299 B2
(45) Date of Patent: May 18, 2021

(54) INSULATING THERMAL BARRIER HAVING HOT AND COLD PCM (71) Applicant: Hutchinson, Paris (FR)

(72) Inventors: Fabrice Chopard, Saint Martin d'Hères (FR); Cédric Huillet, Montargis (FR); Fanny Geffray, Rennes (FR)

(73) Assignee: Hutchinson, Paris (FR)

( * ) Notice: Subject to any disclaimer, the term of this patent is extended or adjusted under 35 U.S.C. 154(b) by 95 days.

(21) Appl. No.: 16/083,422

(22) PCT Filed: Mar. 9, 2017

(86) PCT No.: PCT/FR2017/050541
§ 371 (c)(1),
(2) Date: Sep. 7, 2018

(87) PCT Pub. No.: WO2017/153694
PCT Pub. Date: Sep. 14, 2017

(65) Prior Publication Data
US 2019/0093960 A1 Mar. 28, 2019

(30) Foreign Application Priority Data
Mar. 11, 2016 (FR) ...................................... 1652069

(51) Int. Cl.
F28D 20/02 (2006.01)
F28D 20/00 (2006.01)
F28D 21/00 (2006.01)

(52) U.S. Cl.
CPC .... *F28D 20/026* (2013.01); *F28D 2020/0008* (2013.01); *F28D 2021/004* (2013.01);
(Continued)

(58) Field of Classification Search
CPC ............... F28F 2270/00; F28F 2265/10; F28F 2013/005; F28F 2013/006;
(Continued)

(56) References Cited

U.S. PATENT DOCUMENTS 2,364,144 A * 12/1944 Hunsaker .......... H01M 10/6563
454/239
4,213,448 A * 7/1980 Hebert .................... F24S 20/66
126/589

(Continued)

FOREIGN PATENT DOCUMENTS

WO  WO 95/29057 A1  11/1995
WO  WO 03/073030 A1  9/2003

Primary Examiner — Jianying C Atkisson
Assistant Examiner — Jose O Class-Quinones
(74) Attorney, Agent, or Firm — Blank Rome LLP (57) ABSTRACT A thermal barrier for helping to maintain a temperature in volumes and/or at least one internal structural component surrounded by the barrier. The barrier has a first component containing at least one phase change material (PCM) that changes its state at a first temperature, a second component containing a PCM that changes its state at a second temperature which is different from the first temperature, and a third, thermally insulating component that is disposed between the first and second components containing a PCM or outside the second component.

11 Claims, 5 Drawing Sheets (52) U.S. Cl.
CPC .. *F28D 2021/0028* (2013.01); *F28F 2270/00* (2013.01); *Y02E 60/14* (2013.01)

(58) Field of Classification Search
CPC ........... F28F 2013/008; H01M 10/659; H01M 2/1094; H01M 2/0277; H01M 2/0482; H01M 10/60–667
See application file for complete search history.

(56) References Cited

U.S. PATENT DOCUMENTS

| | | | | |
|---|---|---|---|---|
| 4,482,010 | A * | 11/1984 | Cordon | F24F 5/0021 165/10 |
| 4,572,864 | A | 2/1986 | Benson et al. | |
| 4,581,285 | A * | 4/1986 | Mahefkey, Jr. | B32B 15/08 442/378 |
| 4,924,818 | A * | 5/1990 | Linden | F02B 63/04 123/198 E |
| 5,449,571 | A * | 9/1995 | Longardner | H01M 2/0237 429/120 |
| 5,532,039 | A * | 7/1996 | Payne | B32B 3/12 428/116 |
| 5,637,389 | A | 6/1997 | Colvin et al. | |
| 5,927,381 | A * | 7/1999 | Bednarek | B60H 1/00492 165/41 |
| 7,735,327 | B2 * | 6/2010 | Brower | F24F 5/0017 62/457.2 |
| 2004/0231355 | A1* | 11/2004 | Mayer | C09K 5/063 62/371 |
| 2008/0233368 | A1* | 9/2008 | Hartmann | D06M 23/12 428/206 |
| 2010/0273041 | A1* | 10/2010 | Lawall | H01M 2/1072 429/120 |
| 2012/0305435 | A1* | 12/2012 | Matta | F25D 3/06 206/521 |
| 2013/0062355 | A1* | 3/2013 | Shulman | B65D 81/3897 220/592.01 |
| 2014/0106198 | A1* | 4/2014 | Guha | H01M 10/659 429/120 |
| 2014/0138042 | A1* | 5/2014 | Yagi | B60L 1/02 165/10 |
| 2014/0154539 | A1* | 6/2014 | Kwok | H01M 10/643 429/82 |
| 2015/0280295 | A1* | 10/2015 | Bhunia | H01M 10/6569 429/50 |

* cited by examiner

INSULATING THERMAL BARRIER HAVING HOT AND COLD PCM

The present invention relates to the field of thermal management.

It particularly relates to a thermal barrier for maintaining a temperature, in a volume and/or at least one internal structural element surrounded by this barrier, within a predetermined range while the barrier is disposed in an external environment subjected to a non-constant temperature.

The invention also relates to an assembly comprising at least one such internal volume and a wall provided with this thermal barrier, which will then surround said volume.

Among the targeted applications, the following are of note:

the thermal management of an electric storage battery, or, on an engine that typically heats up while it runs, a device for encapsulating a part of the engine, e.g. all or part of an engine block.

In some cases, it is indeed appropriate to:

isolate said volume and/or said internal structural element from the external environment, and/or act on the propagation of a heat flux to or from this volume or element, and/or smoothing the temperature in said volume or in at least part of a wall with which it may be in contact, or instead promote a temperature increase within the volume, or even, promote a temporary heat storage in the barrier.

In this context, it is proposed here that the thermal barrier include the following:

from the inside (where said internal volume, or the element that is disposed therein, is located) toward the outside:

a first component containing at least one phase change material (PCM) that stores or releases thermal energy through a change of state and having a first state change temperature, and then, a second component containing at least one PCM that stores or releases thermal energy through a change of state and having a second state change temperature, the second state change temperature being different from the first, and a third, porous thermally insulating, component disposed between the first and second components containing a PCM or outside said second component.

For the performance of the thermal insulation, it is recommended that the third thermally insulating component contains a porous (if not nanoporous) material.

And again for this purpose and/or for potential mechanical purposes, it is furthermore recommended that this third thermally insulating component be arranged in a sealed casing, to define at least one vacuum insulation panel (VIP) under a controlled atmosphere.

VIPs are indeed known for their efficiency in terms of thermal insulation. However, the conditions under which they are manufactured or implemented are often imperfect. Hence, a solution herein proposes a PCMNIP barrier, with said first and second components containing one or several phase change materials (PCMs), this barrier being packaged so as to comprise at least one closed outer casing consisting of at least one conformable (e.g. flexible) sheet impermeable to said PCMs and that contains the first, second and/or third components.

To further promote reliability and mechanical strength, it can be provided that said conformable sheet(s) is(are) metallic, and typically of a thickness ranging from 0.05 mm to 5 mm.

With such solutions, whether they are metal-based or not, a highly efficient thermal insulation will be combined with a unique (single or multicellular, see below) packaging that enables thermal management to be implemented where it is desired.

In particular with a metal-walled VIP solution (including alloys, such as stainless steel or aluminium), it will even be possible to depart from a flat VIP board, by providing that said first, second and third components are moulded in a three-dimensional shape and interposed between two metal walls sealed together in an airtight manner, over their entire periphery, to have a leakage rate less than or equal to $10^{-4}$ Pa·m$^3$/s, at the location of the seal(s).

To further optimize the thermal protection, it may be useful for at least one of the first and second thermal barrier components to contain a plurality of PCMs that store or release thermal energy through a liquid-to-solid phase change and having different state change temperatures.

It will thus be possible to gradually introduce barrier effects as heat fluxes that disrupt the maintenance of said internal volume's temperature are passing through.

In addition, several thermal management situations may arise, depending on the application.

Firstly, in many cases, including the thermal management of an electric battery housed in the internal volume, or in a passenger compartment, the recommendation will be that the state change temperature(s) of the PCM(s) of the first component must be lower than the state change temperature(s) of the PCM(s) of the second thermal barrier component, so that at certain temperatures heat fluxes coming from the outside and reaching one and/or the other of said components are slowed down in their progression from the outside to the inside, by a change of state of the PCM(s) in said components(s) reached.

This is a complement or an alternative to the aforementioned barrier effect, each component playing its role of a hot or cold flux as best it can.

And having a thermal barrier wherein the or at least some of the state change temperature(s) of the first component's PCM(s) will be lower than the temperatures of said predetermined temperature range to be maintained, may even reveal itself to be even more profitable, as detailed below.

In this regard, it can be noted right here that, if the PCMs of the internal component crystallize (due to penetration of cold into the barrier, for example following its installation in a vehicle intended to be parked outside on cold nights), they will be able to recharge favourably in the liquid state, at the appropriate moment, as they enter into contact with a heat flux created by the exchange with the internal volume or with the component that is disposed therein: hot flux e.g. in the case of a battery, which releases heat when it is in operation.

Including in these situations and to ensure in the best possible manner the complementarity of the barrier effects with respect to the heat and to the cold, the following may be chosen:

that the highest state change temperature in said first thermal barrier component is equal to, within about 5° C., the lowest temperature of said predetermined temperature range to be maintained, and/or that the lowest state change temperature in said second component of this thermal barrier is equal to, within about 5° C., the highest temperature of said predetermined temperature range to be maintained.

In the case of an assembly comprising at least one volume surrounded by a wall equipped with the aforementioned thermal barrier, providing electric battery cells as the element within the volume whose temperature is to be regulated may turn out to be very useful.

More specifically, at least one cell of this battery could then include an outer casing provided with said thermal barrier.

Moreover, this situation will be a good example of a favourable case wherein such a thermal barrier assembly will include means for temporarily supplying said internal volume with thermal energy, in a heat exchange relationship with said first component containing at least one PCM, to then promote a phase change of said PCM of this first component.

Another favourable case could be supplying conditioned air into a passenger compartment surrounded at least locally by this thermal barrier.

In the case of hot air-conditioning, and in an application with one electric battery, for example, it is even advisable for the means used to temporarily supply thermal energy and said internal volume to communicate with each other so that said energy is supplied into this volume at a temperature greater than or equal to state change temperature(s) of the PCM(s) of first component, which is in a heat exchange relationship with this(these) PCM(s), to thus promote their liquefaction.

Outdoors in cold weather, they will thus be regenerated, ready to solidify when faced with the cold coming from the outside.

It may however occur that, in a second category of situations, it is necessary to promote/speed up an increase in temperature within the internal volume, for example for the thermal management of a combustion engine that would be locally surrounded by said thermal barrier, or again in a pollution control system on a vehicle exhaust line in which a quick rise in temperature is desired.

In such cases, it will be preferable to choose that the state change temperature(s) of the PCM(s) of the first component (internal) is(are) lower than the state change temperature(s) of the PCM(s) of the second component (further outside), to slow down, through a change of state, a heat transfer from the inside toward the outside resulting from the supply in the internal volume of a fluid at a temperature at least higher than or equal to that(those) of the state change or of the PCM(s) of said first component, thus promoting or speeding up a temperature increase within the internal volume.

In this second category of situations, it may be usefully provided that the thermal barrier is disposed in an external environment:
that is periodically warmer (due to the heat released by the engine's operation) than the state change temperature(s) of the PCM(s) of the second component,
and with which the PCM(s) of said second component are disposed in a heat exchange relationship,
to thus promote their liquefaction.

It will thus be possible to ensure the regeneration of the outermost PCMs when an engine will be heating up, for example an engine encapsulated at least locally by the barrier presented here.

In all the preceding cases, it may be advantageous for said third thermally insulating component to be disposed between the first and second, respectively internal and external, components of the thermal barrier.

In fact, although this is not essential, it will clearly distinguish the two, respectively cold and hot, blocks of PCM each having its function, while the intermediate thermal insulation will allow slowing down the influence of one on the other.

In principle, in all the targeted applications, it may additionally be of interest, if several PCMs having different state change temperatures are provided in at least one of the first and second components, that these PCMs are dispersed in a matrix rather than arranged in several layers of materials each containing a said PCM.

The thermal management obtained will thus be by area, rather than by stratum, which would improve the efficiency of the management or at the very least the production of the barrier.

From the foregoing, it will be understood that, translated into terms of thermal management method, the solution presented above has the following particularity:

if the focus is exclusively on the thermal barrier:
said barrier will first be produced;
it will then be disposed around said internal volume, or the element disposed therein, so that said first and/or second thermal barrier components slow down, through changes of state, a heat flux coming from the outside;

and, if the focus is one the aforementioned assembly:
the thermal barrier will still be produced with PCMs changing between liquid and solid phases;
it will then be disposed around said internal volume, or the element disposed therein, again so that said first and/or second thermal barrier components slow down, through changes of state, a heat flux coming from the outside;
moreover, once the change of state of said at least one PCM of the first thermal barrier component has been performed, another change of its state will be promoted by a temporary supply of thermal energy resulting from said means (20, 22; 24; 26) for temporarily supplying thermal energy.

BRIEF DESCRIPTION OF THE DRAWINGS

If necessary, the invention will be better understood and other characteristics, details and advantages thereof will become apparent upon reading the following description as a non-exhaustive example with reference to the appended drawings in which.

DETAILED DESCRIPTION

Hereunder we will therefore deal with the following as non-limiting examples:

the case of a storage battery, the case of a living compartment in a motorhome, the case of an engine's external thermal protection device, respectively provided with a thermal barrier meeting all or part of the aforementioned characteristics.

For the sake of unity in the approach adopted, it should be noted that the thermal management solution proposed here should preferably be autonomous, light and compact.

It should also be noted that the industry is currently prompted to accelerate the marketing of new technologies that can reduce pollution emissions, smooth any occasional increases in thermal loads or gradients in relation to a nominal sizing operation, or propose solutions to shift the release of available energy in time to another time, or foster the operational functioning of an element in its optimum operating temperature range.

All or part of the above solution involving PCMs and thermal insulation(s) must help achieve this.

For any purpose, it is confirmed that a phase change material (PCM) designates a material capable of changing its physical state from solid to liquid within a restricted temperature range contained between −50° C. and 60° C. (battery) or even 160° C. (engine encapsulation). Heat transfer (or thermal transfer) can be achieved by using the Latent Heat (LH) thereof: the material can then store or transfer energy by a mere change of state, while maintaining a substantially constant temperature, that of the change of state.

The thermally insulating material(s) associated with the PCM(s) may be a "simple" insulating material, such as glass wool. But, a foam, e.g. polyurethane or polyisocyanurate foam, or more favourably a porous, or even a nanoporous, thermally insulating material arranged in a sealed casing to define at least one VIP, will certainly be preferred.

Again, for any purpose:

"PIV" means an enclosure under "controlled atmosphere", i.e. either filled with a gas having a thermal conductivity lower than that of ambient air (26 mW/m·K) or "under a vacuum", i.e. under a pressure lower than the ambient pressure (<$10^5$ Pa). A pressure between $10^0$ Pa and $10^4$ Pa inside the enclosure may be particularly suitable. The enclosure may contain at least one thermally insulating material that in principle is porous (pore sizes less than 1 micron). In this case, the performance of the thermal management to be ensured will be further improved, or even the overall weight decreased with respect to another insulating material. Typically, vacuum insulating panels (VIPs) are thermal insulating materials wherein at least one porous material, for example silica gel or silicic acid powder ($SiO_2$), is pressed into a board and surrounded, under a partial vacuum, by a gas-tight wrapping foil, for example made of plastic and/or roll-formed aluminium. The resulting vacuum typically allows lowering the thermal conductivity to less than about 0.003/0.01 W/m·K under the conditions of use. A 3 to 10 times greater insulation efficiency than that of more conventional insulating materials is thus achieved. A thermal conductivity λ less than 0.008/0.01 W/m·K is preferably expected here;

"porous" designates a material having interstices enabling the passage of air. Open-cell porous materials thus include foams but also fibrous materials (such as glass wool or rock wool). The passage interstices that can be qualified as pores have sizes of less than 1 or 2 mm so as to be able to guarantee proper thermal insulation, and preferably less than 1 micron, and more preferably less than 1 to $2\times10^{-8}$ m (nearly nanoporous structure), in particular for reasons of resistance to ageing and therefore possible lower negative pressure in the VIP enclosure.

"conformable" corresponds to a structure that can be deformed, for example bend, by hand;

"sealable" relates to a weldable connection, more specifically heat-sealable or even solderable, in particular with sheets or films (finer).

With regard to these VIPs and PCMs, it was further noted that they do not seem to meet the expectations of the market so far. In particular, their implementation in the field is a problem, especially their packaging. There are solutions proposed here that overcome this situation.

Thus, to a certain extent, whatever the external conditions may be (hot or cold), the invention proposes to contribute to maintaining the temperature of a volume and/or of a element disposed therein (e.g. a battery pack) within an optimal range, based on an autonomous system.

Figure 1:
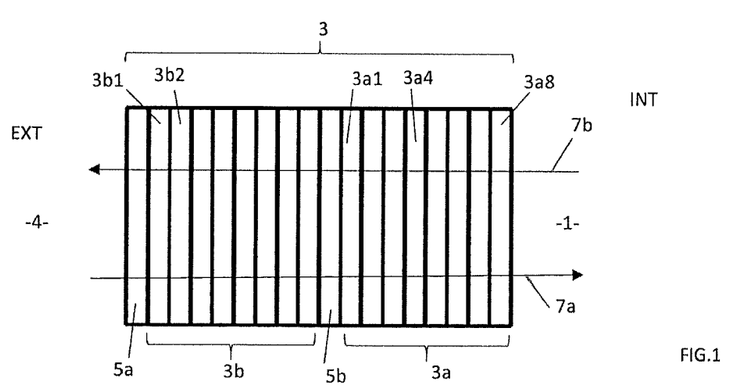
FIG. 1 is a schematic cross-section showing one half of the thermal barrier according to the invention.

FIG. 1 thus shows the principle of the solution developed.

Let us consider a block, an internal volume (hollow space) or structure, 1, that, for example, produces heat at certain operational instances and not at others, such as an electric battery that heats up when its cells produce electricity.

The internal block 1 is surrounded by a thermal barrier 3. "Surrounded" implies that the internal volume 1 is directly or indirectly bordered by the barrier 3 (e.g. with the interposition of walls, including a thermally insulating wall, such as that shown in 5a or 5b—see below), on at least part of its periphery, for example at least on one face.

The aim is to maintain the temperature of block 1, or therein, within a predetermined range while the barrier 3 is disposed in an external environment 4 subjected to a non-constant temperature, such as typically ambient air between −20/−30° C. and 50° C.

To this end, the thermal barrier 3 at least comprises the following, from the inside (INT) toward the outside (EXT):

at least one first component 3a containing at least one PCM and having a first phase or state (physical) change temperature, at least one second component 3b also containing a storing PCM and having a second state change temperature, the second state change temperature being greater than the first, at least one third thermally insulating component, there are two in the example: 5a, 5b disposed between said first and second components 3a, 3b and/or outside said second component 3b.

The components 3a, 3b must (at least) contain a PCM in the sense that they will be made exclusively or not with (pure) material or more likely with (at least) one PCM disposed in a matrix, with loads.

A rubber compound as described in EP2690137 or in EP2690141 may be provided as a structure of one or the other component 3a, 3b, i.e. in the second case a cross-linked compound based on at least one room temperature vulcanized (RTV) silicone elastomer and comprising at least one PCM, said at least one silicone elastomer having a viscosity measured at 23° C. according to standard ISO 3219 that is less than or equal to 5000 mPa·s. In this case, the elastomer matrix will mainly consist (i.e. based on an amount greater than 50 phr, preferably greater than 75 phr) of one or several "RTV" silicone elastomers. The thermal PCM may consists of n-hexadecane, eicosane or a calcium salt, all having melting points below 40° C.

The other component 3b or 3a may be based on paraffin, eutectic fatty acid (myristic-capric) or eutectic hydrated salt (calcium chloride+potassium). There are other possibilities, such as a PCM impregnated in a porous network.

Figure 2:
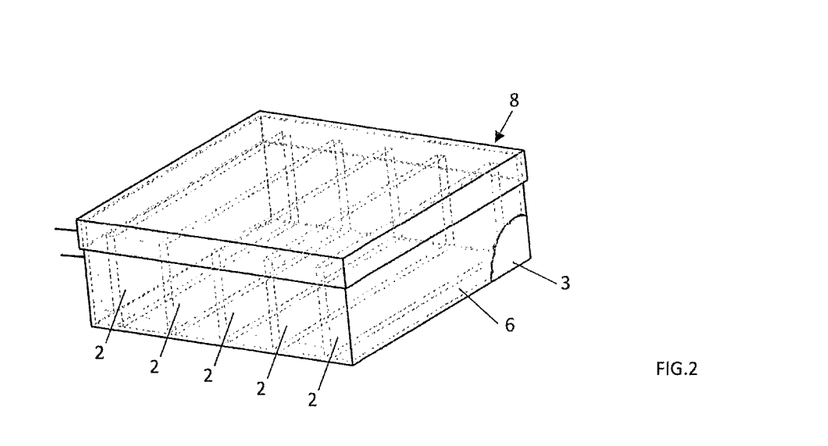
FIG. 2 schematically shows the application of a thermal barrier according to the invention to cells of a battery pack.

Let us assume operational conditions under which the block 1 is a volume containing, as shown schematically in FIG. 2, electricity producing cells 2 of a battery wherein the temperature, TB, is ideally to be maintained between 25° C. and 35° C. EB will be the battery's operating state: OFF (when in operation) or ON (when stopped). The barrier 3 will then be favourably combined with the wall 6 of a case, or enclosure, 8 in which the cells 2 may be enclosed, whether or not they are packaged together. In practice, and in particular if a pocket constitution 13 is retained (see below), the barrier 3 may come to double the (plastic, composite or even metal) wall 6 or be integrated therein (e.g. by moulding).

Let us also assume that conduction and convection means (such as metal fins defining air circulation channels between each other) are favourably present to aim at maintaining this internal temperature range, if the temperature of the external environment also changes from 25° C. to 35° C. and as long as the battery is running (engine equipped with this battery not stopped), it being specified nevertheless that the barrier 3 is indeed efficient whether such means are provided or not.

As soon as the temperature TA of the external environment can in fact vary between −20° C. and 45° C., several disruptive situations may arise, breaking the internal/external thermal equilibrium, especially when said convection means will stop (typically when the engine is stopped). Thus:

if the external medium 4 has a temperature greater than 35° C. (e.g. hot weather), then there will start to be a rise in internal temperature, in block 1, If the external medium 4 has a temperature below 25° C., then there will instead start to be a drop in said internal temperature.

In order to limit these incoming or outgoing heat fluxes (arrows 7a, 7b in FIG. 1), one, in this case several, layer(s) of insulating material or of super-thermal insulating material 5a, 5b has first been installed. A thermally insulating layer 5a is thus disposed around the second component 3b with PCM. And a thermally insulating layer 5b is disposed between the first and second component with PCM 3a, 3b. The layer 5a could also be on the inside of the first internal thermal barrier component (against the layer 3a8 in FIG. 1).

Whatever the case may be, without the respectively hot 3b and cold 3a PCM layers, which will store energy as they melt (liquefaction) and release it again as they crystallize, the action of the thermal insulation will remain insufficient.

Hence, the interest of having one, and preferably several, layer(s) 3a based on "cold PCM" with one or several crystallization temperatures Tc<=25° C., as in the example, and one, and preferably several, layer(s) 3b based of "hot PCM", with one or several melting temperatures Tf>=35° C., as in the example.

Their main common function is to contribute to continuously maintaining the temperature of block 1 in the desired range: in this case a battery temperature ranging from 25 to 35° C.

Figure 3:
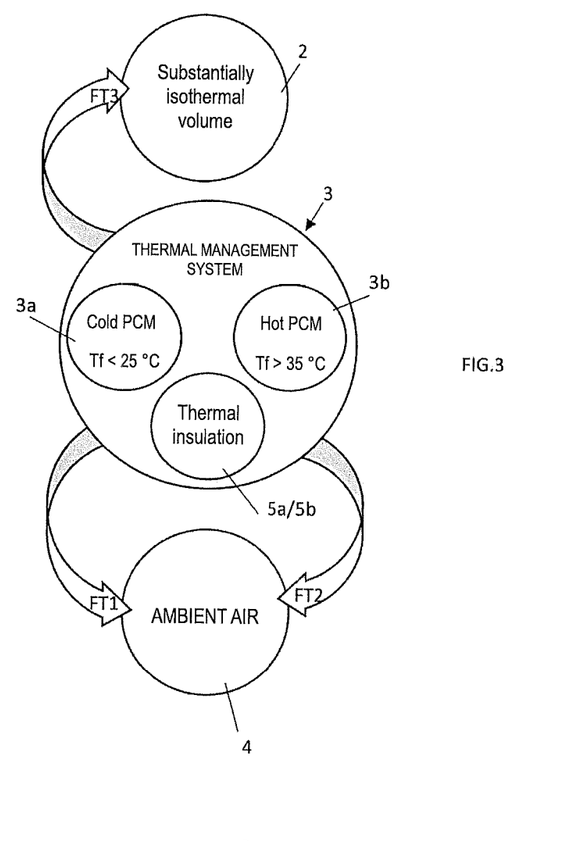
FIG. 3 is a diagram of the operating mode of a thermal barrier according to the invention.

The operational technical functions are as follows (see diagram in FIG. 3):

FT1: control the action of the ambient cold (for TA=<25° C.) and slow down the propagation of cold towards the internal volume;

FT2: control the action of the ambient heat (for TA>=35° C.) and slow the propagation of heat towards the internal volume;

FT3: limit heat transfer from the inside to the outside (for TB=<35° C. in the case of a battery).

One imposed constraint is that this solution be light, compact and operate without supplying any external energy to the battery and without the battery using any electrical energy. The barrier 3 will then be considered as operating autonomously.

Their changes are as follows:

a) "cold PCM(s)": the PCMs all melt or crystallize at their state change temperature, all melting temperatures being <25° C.:

thus, these layers 3b absorb and store the so-called cold energy (releasing crystallization heat) when they crystallize, thereby delaying the propagation of cold from the environment 4 towards the battery;

and release stored cold energy (or absorb and store heat through liquefaction) when the PCMs melt.

Let us assume that a battery shutdown occurs after an operation phase (EB becomes OFF). The layers of "cold MCP" have melted. They are liquid. The internal temperature in the block 1 is then greater than 25° C. During the following hours, for example as the evening arrives, the barrier 1 will go down in temperature due to low outside temperatures TA, which can for example be between −2° C. and 10° C. The goal of the cold PCM-based layers 3a is then to delay this drop in internal temperature by storing crystallization energy. All cold PCM layers 3a associated with the insulation 5a and/or 5b must make it possible to limit the temperature drop of the volume 1.

Once the battery will be operating again (EB becomes ON), quickly TB>=25° C. The cold PCM layer(s) 3a will then liquefy, preventing (limiting) the battery's heat from leaving towards the outside, resulting in a loss, as long as TB is not excessive. Moreover, the generated heat and its dissipation in the barrier will then be used to regenerate the cold PCMs which will have crystallized during the shutdown phase;

b) "hot PCMs": the PCMs all melt or crystallize at their state change temperature, with melting temperatures >=35° C.:

thus, these layers 3a absorb the thermal energy when they melt, thereby delaying the propagation of hot energy from the environment 4 towards the battery (block 1);

and release the hot energy that they have stored, when their PCMs have crystallized at T<35° C.

Let us assume that it is hot outside: ambient temperature TA=38° C. The layers 3b based on "hot PCMs" liquefy, delaying the propagation of heat towards the battery, by absorbing the hot energy. This contributes to maintaining the battery in its range of favourable operating temperatures (25° C. to 35° C.).

In the evening, or later, if TA<=35° C., this(these) "hot PCM"-based layer(s) will recrystallize, at least through natural convection.

If EB then becomes ON (again) (the battery again produces electricity), the next morning for example, when the vehicle will be started again, and TB>=35° C. (no said means of conduction and convection or immediate response issue), the crystallized layers 3a will be able to absorb some of the heat generated by the battery, thus promoting its operation.

The above for one thing confirms the interest:

for the two layers 3a and 3b to have at least two compositions based on PCM(s) each having different state change temperatures: 25° C. and 35° C. respectively in the example, and therefore even favourably that at least one of the first and second components 3a, 3b comprises several layers of materials each containing a PCM ("cold MCP" and "hot MCP"), respectively with layers such as 3b1, 3b2 and 3a1 . . . 3a8.

In the latter case, the advantage of providing state change temperatures that increase from the first innermost layer to the last outermost layer will be to gradually introduce the expected thermal barrier effects.

It will thus be possible to provide the following:

at least two layers 3b1, 3b2, thus with two state change temperatures, for example one melting temperature that is lower Tf1=35° C. for the innermost layer 3b2 and another that is higher Tf2=40° C. for the outermost layer 3b1;

more than two layers, for example eight layers, 3a1 . . . 3a4 . . . 3a8, thus with as many state change temperatures, for example ranging from 5° C. to 20° C. (outermost layer 3a1) and −15° C. (innermost layer 3a8).

An advantage of the thermally insulating layer 5b interposed between the layers 3a and 3b is to limit heat transfers between the "cold PCM" and "warm PCM" layers, letting each one act as fully as possible, including with regard to the smoothing effect. A comparable subject can be applied to the layer 5a, in this case the outermost of the barrier 3, which forms the first (direction 7a) or the last (direction 7b) insulating obstacle. As for said distribution in multiple (sub)layers of the PCMs, from an industrial standpoint, it will most likely be redisposed with the use of several PCMs having different state change temperatures and that will be dispersed in a matrix (see solution in FIG. 14).

Figure 4:
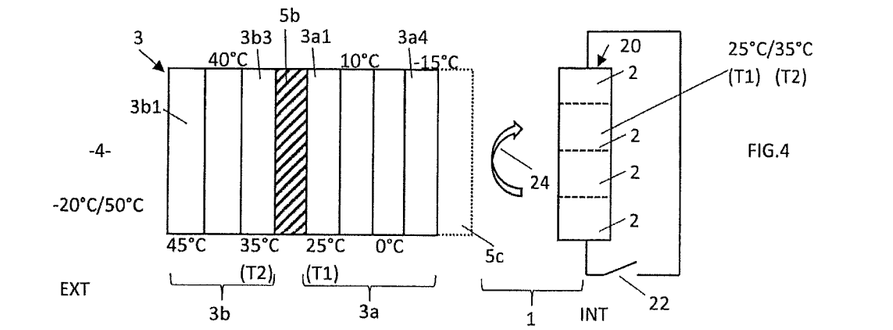
FIGS. 4 to 7 schematically show the proposed solution operating as a dual thermal barrier, for example, in an application with respectively prismatic batteries and batteries of a "new type" (FIGS. 4, 5) and for comfort management in the living compartment of a motorhome (FIGS. 6, 7); it could also be the cab of a lorry, or even a greenhouse.

FIG. 4 schematically shows the aforementioned procedure in the typical case where the barrier 3 surrounds, preferably on all sides, the internal volume 1 in which is disposed a pack 20 of prismatic battery cells 2.

Examples of solid-to-liquid state change temperatures of the PCMs present (or dispersed, see below) in each layer of the first and second PCM-containing components 3a, 3b are indicated.

As shown in the figure, these state change temperatures are generally increasing from the inside (INT) to the outside (EXT). A consistency between the temperatures T1 on the one hand and T2 on the other, with T2 being greater than T1 should be noted, on the basis of the explanations that follow.

In this case with prismatic cells 2, the predetermined range of temperatures to be maintained during operation, when the switch 22 of the circuit that controls the battery operation and cutoff is closed, ranges from 25 to 35° C. (optimally, it could be expanded by 5° C.).

To ensure this maintenance, a barrier must be established against the cold or heat exceeding these boundaries and coming from outside 4 (EXT).

Let us initially assume that all the PCMs are "recharged", i.e. solid state for hot PCMs and liquid for cold PCMs.

If it is too hot, for example 38° C., the PCMs from the layers marked 45° C. and 40° C. that are then liquefied have delayed the heat flux entering from the outside toward the inside.

If, for example at night, the outside temperature drops to 10° C., the cold PCMs would then crystallize, thus delaying or slowing down the temperature drop in the battery pack.

At the same time, the "hot" PCMs of the second PCM-containing component 3b will then all "recharge", by crystallizing, if care has been taken to ensure that the state change temperature T2 of the PCM of the layer 3b3 on external contact with the intermediate insulating material 5b is equal to (within 10%) the maximum temperature (T2) of the range to be maintained (in this case 35° C.), the state change temperatures of all the other PCMs of the second component 3b being greater than T2. The highest state change temperature of these PCMs (in this case 45° C., outermost layer 3b1) is lower than (or equal to) the assumed maximum outside temperature, in this case 50° C.

On the internal face, the last PCM, in this case in layer 3a4, will by the way also be able to "recharge", in the same manner as all other PCMs of the first component 3a, by liquefying:

if care has been taken to ensure that the state change temperature T1 of the PCM in layer 3a1 on internal contact with the intermediate insulation material 5b is equal to (within 10%) the minimum temperature (T1) of the range to be maintained (in this case 35° C.), the state change temperatures of all the other PCMs of the first component 3a being less than T1;

and if, at any given time, the PCMs of the first component 3a have been disposed in a thermal exchange relationship with the heat flux 24, in this case hot, generated in the volume 1 by the operating battery.

Therefore, in order for the PCMs of the first barrier component to be liquefied again after a cold period (in this case, outside temperature lower than 25° C.) during which they have (at least) delayed the propagation of this cold towards the battery 20, the heat released by the operating battery will be allowed to reach the temperature T1, or a temperature between T1 and T2.

Typically, after the battery's operational operating time interrupted in this case by opening the switch 22, the flux 24 will have caused the PCMs of the first component 3a to (re)liquefy.

And this may happen even if the inner face of the first component 3a is doubled up with an additional optional thermally insulating layer 5c.

Figure 5:
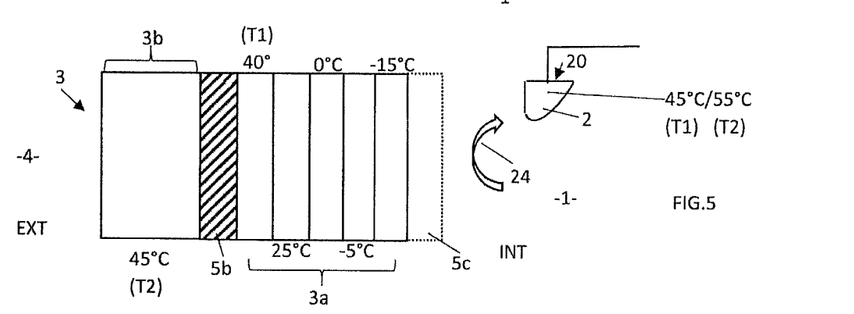
Figure 6:
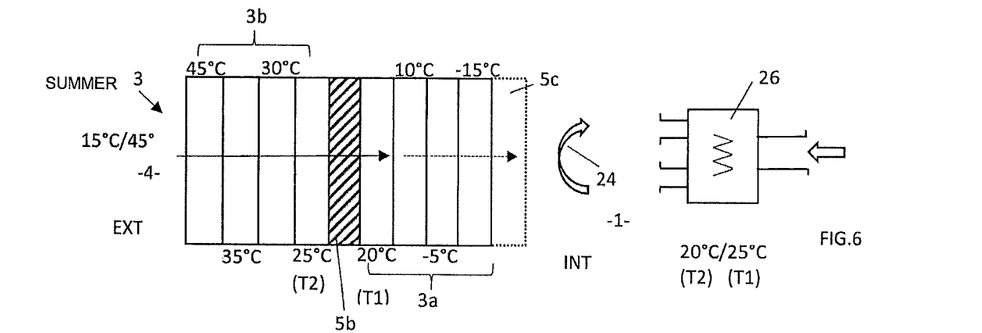
Figure 7:
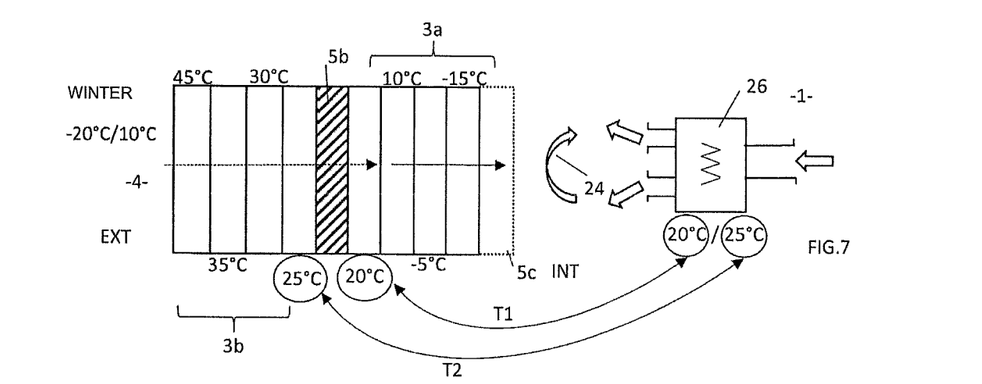

FIGS. 5 to 7 were drawn up based on the same explanatory and operating principle as that in FIG. 4. The foregoing is therefore applicable to them, down to the temperature values and to the applications:

FIG. 5 applies to the case of a next generation battery operating at the optimum temperature between 45 and 55° C.

FIGS. 6, 7 apply to the case of a passenger compartment 1 the temperature of which is to be maintained between about 20 and 25° C. both in summer (FIG. 6) and in winter (FIG. 7), as shown in the example.

In any case, the same distinctive characteristics of the temperatures T1 and T2 (see FIG. 6 in particular) are found.

In the case of the next generation battery operating at the optimum temperature between 45 and 55° C., the second component 3b may only consist of a single PCM, for example at a phase change temperature of 45° C. (below which it will crystallize), since the maximum outside temperature defined here is 55° C. and that of T2 is equal to 50° C.

There are therefore cases where at least one of the barrier components 3a, 3b can be single-layered and/or single-PCM.

In FIGS. 6, 7, facing a flux from the outside to the inside, the arrows through the components 3a, 5b, 3a indicate the thermal barrier effects at the specified outside temperatures (solid lines), as well as the parts that are then inoperative (dotted lines), due to these same temperatures.

A start-up, for example on a cold morning as in the case of FIG. 7 showing the internal passenger compartment heating device 26 (volume 1), e.g. at 20° C., will again enable a hot flux 24, in this case air, to recharge through liquefaction the "cold" PCMs of the first internal thermal barrier component 3a. For example, an on/off switch and/or means for adjusting the expected temperature at the output of the heating device 26 are integrated in it to make the heat flux 24 only temporary.

Figure 15:
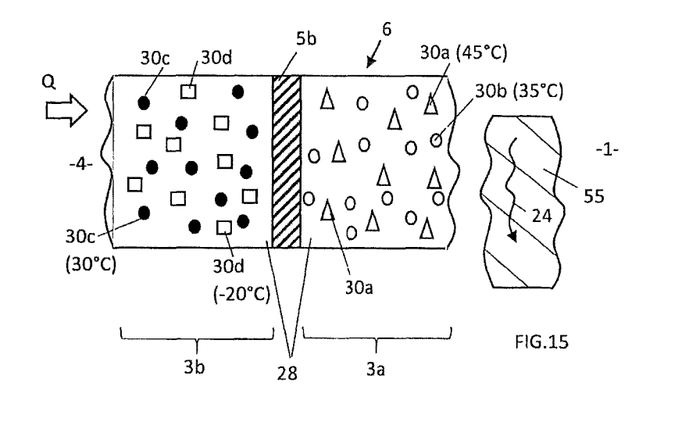
FIG. 15 schematically shows the proposed solution operating as a dual thermal barrier, in an engine shield application.

As to FIG. 15, it schematically shows the use of the wall 6, provided with the first and second thermal barrier components 3a, 3b, as a local protective shield, around an engine component, such as a cylinder head.

Each of the components 3a, 3b contains several PCMs in the example. And, as in other cases presented here, the internal volume 1 may be that of a distinct element, separated from the wall 6, as in this case the engine element concerned. A thermally conductive wall 55, such as the metal wall of this engine element, could thus be interposed between the internal component 3a of the wall 6 and the volume 1. In a general manner, the heat exchange could thus be indirect between the internal component 3a of the wall 6 and the volume 1.

This wall 55 of the engine element could then define the means for temporarily supplying thermal energy promoting the liquefaction of the first component's 3a PCMs, by placing it in a heat exchange relationship with them. It may indeed be considered that, when the engine is running, this energy could be brought to about 55 to 60° C. in this volume (or even significantly higher), thus to a temperature that is both higher than the state change temperatures of the PCMs 30a, 30b (assumed to be respectively of 35° C. and 45° C.) and then the temperature to be maintained in the volume 1 (around 50° C.) when the engine is stopped and that the engine is to be restarted with the best possible performance within the next 30 to 60 minutes while its wintry cold outside (0° C.).

In the particular case of the aforementioned shield, the external component 3b will typically aim to protect against the cold, while the internal component 3a will serve to accelerate the temperature increase within the volume 1 and the wall 55, in the above case where an engine is to be restarted after having been shut down for 60 min or less.

It is therefore possible to favourably choose state change temperatures ranging from −20° C. to 30° C. in the external component 3b and from 30 (or 35° C.) and 45° C. in the internal component 3a, the thermal insulation 5b being interposed between them.

Let us assume that the engine has been running for several hours. It is hot. As long as the temperature within the wall 55 remains around 95° C., the assumed nominal operating temperature, the PCMs of the internal component 3a are liquid. Those of the external component 3b are also liquid, due to the supply of energy Q brought to more than 40° C. in the external environment 4 by the operation of the engine.

When the engine is stopped and the vehicle is parked at 0° C. as in the example, some (one in the example) PCMs of the barrier 3b turn solid. This slows down or delays the internal cooling of the wall 6. The same goes for the internal component 3a: the PCMs have crystallized, releasing their hot energy, and thus having slowed down the cooling in 1 and 55.

When the engine, which has cooled down, restarts, as soon as the temperature of the wall 55 reaches then exceeds 35° C. and then 45° C., the PCMs of the internal component 3a liquefy again. The wall 55 remains around 90 to 120° C., which is the assumed range of nominal temperatures.

Figure 8:
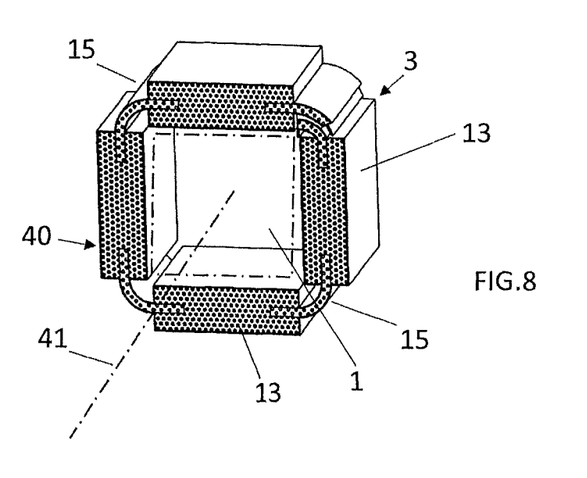
FIGS. 8, 9 show perspective diagrams of the barrier, in two different embodiments.
Figure 9:
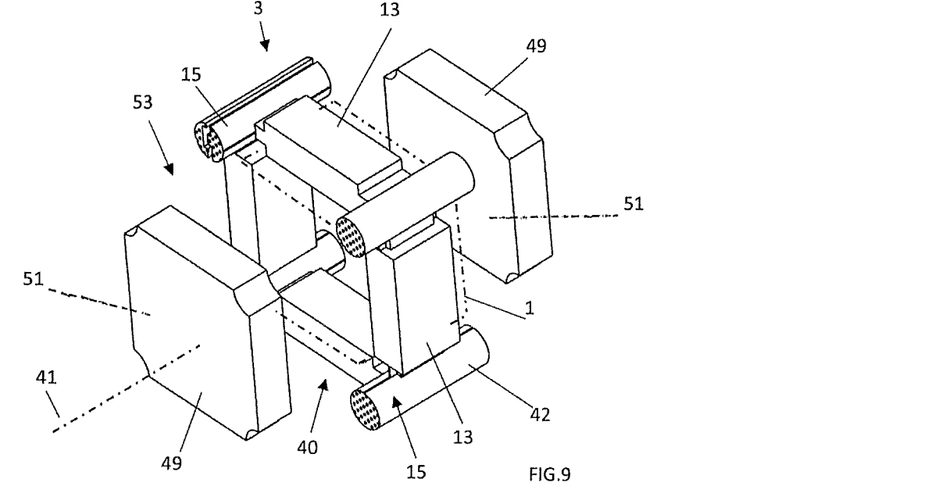

Yet another possible application of the thermal barrier 3 may be found in the embodiment of a sleeve 40 of the type shown schematically in FIGS. 8 and 9, which is exposed, around it, to an environment 4 with variable temperatures surrounding a central block 1 transversely to a reference axis 41.

The central block may for example be a container with medication to be kept at a low temperature, for example between 1 and 5° C., or be defined directly by the internal volume of this container, which would include the barrier 3 in the thickness of all or part of its walls. Another hypothesis would be keeping food warm, for example between 25 and 45° C., in a box which would again include said barrier 3 in the thickness of all or part of its walls. Isothermal maintenance of the block 1 via a heat-insulated case with a thermal barrier 3 can therefore be aimed for.

In fact, the relative position (more inside or more outside) of the hot and cold PCMs 3a, 3b within the barrier 3 and the location of the thermally insulating layer(s) such as 5a, 5b will be defined according to the direction of the thermal gradient between the inside 1 and the outside 4.

The two sleeves 40 shown schematically in FIGS. 8, 9 are formed from a strip of articulated panels with continuous thermal insulation, represented in an operational state, closed on itself.

Each comprises a series of barrier pockets 13 joined in pairs by flexible (or conformable) intermediate portions 15 where two successive pockets can be articulated with one another.

Figure 10:
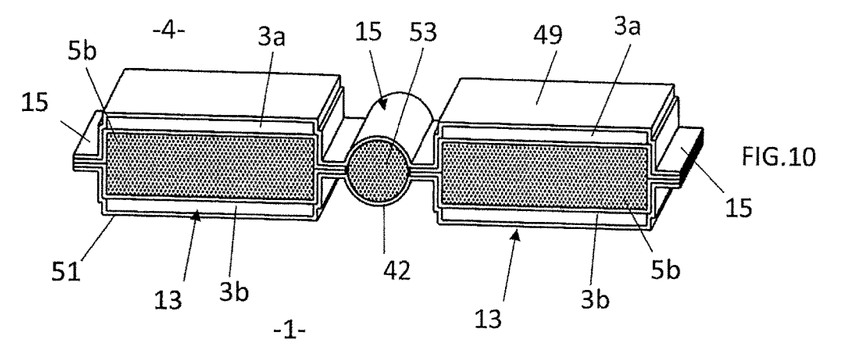
FIGS. 10 to 13 schematically show cross-sections of various embodiments of thermal barrier sections which, at least at the location of the aforementioned pockets, may each have the internal structure shown in FIG. 1, or a structure as described below.

In one of the cases (FIGS. 9, 10), between two such articulated areas there is a bulged portion 42 that is (at least) thermally insulating.

In the other case (FIGS. 8, 11), said intermediate portions are entirely defined by a structure 43 with at least thermally insulating material(s) 45 (preferably porous so that they can be integrated in an overall VIP structure), ensuring a continuous thermal insulation between two successive pockets 13. The material 45 may be identical to the porous thermally insulating material(s) of the layers 5a and/or 5b.

Figure 12:
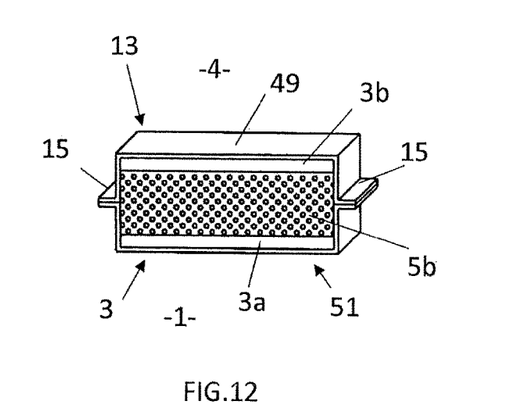
Figure 13:
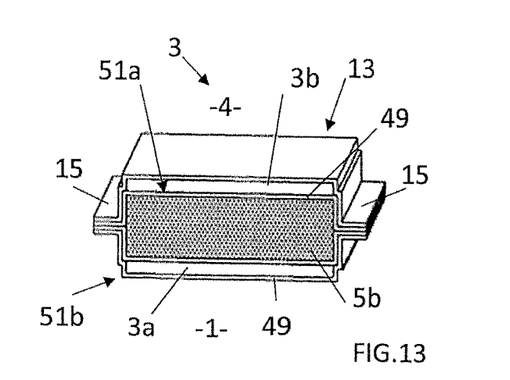

Like the peripheral enclosure that will bring and keep together the various aforementioned layers of the barrier 3, these layers of thermally insulating materials and based on hot and cold PCM (as the layers 3a, 5b, 3b in the example of FIGS. 10 to 13) are completely enclosed in one or several conformable sheets 49 of a single (FIGS. 10 to 12) or dual (FIG. 13) enclosure. The metal or plastic sheets 49 are sealed together (e.g. welded) over the entire periphery of said layers of materials, for imperviousness and for the a priori desired VIP construction of the enclosure 51. The sheet(s) of a few tenths of a millimetre to a few millimetres in thickness will enclose, preferably in one piece, the pockets 13 and the connecting portions 15. A solution may therefore be, for the enclosure 51, to at least form a first impervious inner enclosure 51a (each) containing a thermally insulating layer (5a, 5b), the whole, with the PCM-containing layers (3a, 3b), being contained in a second outer enclosure 51b that is not necessarily impervious (FIG. 13).

Figure 11:
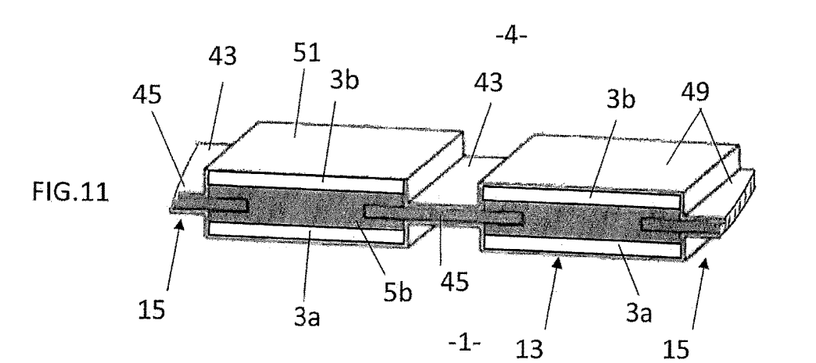

In the example of FIG. 11, the porous material (in this case a board or plate) of each flexible structure 43 is interrupted in the porous thermally insulating material 5b that fills the pockets 13. There could however be continuity therein.

To produce the intermediate portions made of material 45, it may in particular be possible to use a flexible matrix made of a polymer mesh a few millimetres thick impregnated with an organic aerogel, for example silica, or the pyrolysate thereof (pyrolysed aerogel, it being specified that this alternative pyrolysate applies to each case of the present description wherein a porous thermally insulating material is concerned).

In the example of FIGS. 10 to 13, the hinge portions 15 are each defined by the sheets 49 bonded, for example, by the internal vacuum created. The bulged portions 42 (FIG. 10) contain at least one thermally insulating layer 53, or even at least one PCM layer.

Thicker than the impregnated fabrics in FIG. 11, for example more than 2.5 to 3 times thicker, as illustrated, the pockets 13 will typically be stiffer than the flexible articulation structures 15.

Typically, a pocket 13 with nanoporous aerogels as core materials or the pyrolysate thereof and therefore hot and cold PCMs may have a thermal conductivity of less than 100 mW·m-1.K-1 at 20° C. for an internal pressure of 2 to 5 to $10^{-3}$ Pa. The negative pressure within the pockets, or even within the portions 21, may be that usual for VIPs: $10^{-2}$ to $10^{-3}$ Pa.

To keep each band forming the sleeve 40 closed on itself, a fastening system can be provided at two opposite ends of the strip, with a detachable Velcro® type connection, for example.

At the location of its open ends, as shown schematically in FIG. 6, each sleeve will favourably receive covers 490 provided with at least one thermal insulation 51, if they are not themselves also each provided with a barrier 3.

A case 53 forming a barrier with an autonomous thermal management system can thus be established around one block 1 whose temperature is to be managed. And, the use of VIPs with porous insulation complex/hot and cold PCM should make it possible to achieve a thermal resistance R=5 $m^2$·K/W with only 35 mm of insulation.

The hot PCM(s) are interesting in this case especially in the phase when the engine is shut down. When the system drops in temperature due to the lower external temperature conditions with respect to the temperature of the volume 1, a temperature stage is marked at the change temperature of the(each) PCM present. This allows delaying the transfer of the heat flux compared with a solution without PCM. When the engine restarts, the hot PCM(s) contribute to a faster rise in temperature of the engine block, but to a lesser extent.

Figure 14:
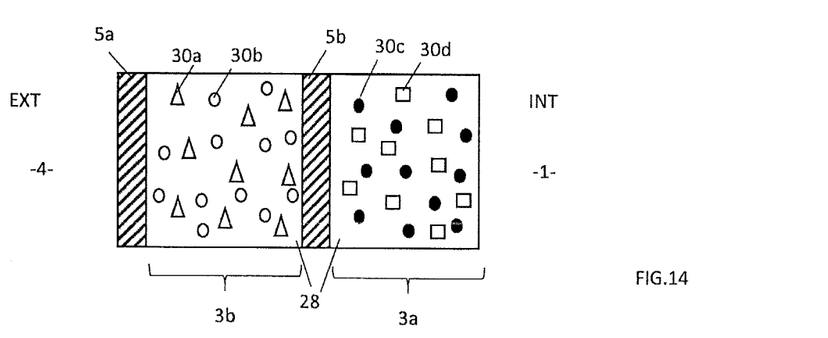
FIG. 14 schematically shows hot and cold PCMs respectively dispersed on one side of a thermally insulating intermediate layer for the former and on the other side for the latter.

As explained above, the hot and/or cold PCMs will preferably be dispersed, respectively for the former on one side and for the latter on the other side of the thermally insulating intermediate layer 5b, in a matrix 28, typically a composite thermoplastic or an elastomeric matrix.

Hereinafter, an example of components, respectively containing hot PCMs and cold PCMs, is provided for a battery operating favourably between 25° C. and 35° C.

More specifically, this may be encapsulated PCMs arranged, typically dispersed, in a matrix or support, which may be an elastomer, a silicone, or derivatives, EPDM (ethylene-propylene-diene monomer) or HNBR (copolymers hydrogenated butadiene-acrylonitrile copolymers also known as "hydrogenated nitrile rubbers") or NBR (copolymers butadiene-acrylonitrile copolymers, also known as "nitrile rubbers"). EP2690137 and EP2690141 provide examples thereof.

It should however be noted that any PCM may have a change of phase or state at a predetermined temperature peak or which is established over a more or less wide temperature range. Thus, with a pure PCM (such as a paraffin) the state change temperature will be constant, while it may be non-constant with several PCMs, such as for example a mixture of paraffins.

In general, since both cases may be encountered in the present application in connection with the PCM(s) provided for, any PCM state change temperature must in this case be considered within a range of 10° C., and typically of +/−5° C.

The invention claimed is:

1. An assembly comprising:
a thermal barrier for helping to maintain a temperature within a predetermined range in an internal volume and/or with respect to an element that is disposed in the internal volume, while the thermal barrier is thermally exposed to an external environment subjected to a non-constant temperature, the thermal barrier including, from inside, where the internal volume or the component disposed therein is located, towards outside, where said external environment is located:
a first phase change material that stores or releases thermal energy through a change of phase and has a first phase change temperature, and
a second phase change material that stores or releases thermal energy through a change of phase and has a second phase change temperature, the first phase change temperature being colder than the second phase change temperature, then,
a thermally insulating component disposed outside said first phase change material and said second phase change material, so that said thermally insulating component is interposed between the external environment and both the first phase change material and the second phase change material, and,
means for supplying to said internal volume and/or said element a thermal energy that is in a heat exchange relationship with at least said first phase change material, to thus promote the phase change of at least the first phase change material, wherein said means for supplying to said internal volume and/or said element said thermal energy provides the thermal energy at a temperature that is from time to time hotter than the first phase change temperature.

2. The thermal barrier according to claim 1, wherein the phase change temperature of the first phase change material is colder than the temperatures of said predetermined temperature range to be maintained.

3. The thermal barrier according to claim 1, wherein the phase change temperature of said first phase change material is equal to, at least within 5° C., the lowest temperature of said predetermined temperature range to be maintained, and/or the phase change temperature of said second phase change material is equal to, within at least about 5° C., the highest temperature of said predetermined temperature range to be maintained.

4. The assembly according to claim 1, wherein said internal volume encloses, as of said means for supplying thermal energy, electric battery cells producing heat whose temperature is to be regulated.

5. The assembly according to claim 1, wherein said internal volume encloses, as of said means for supplying thermal energy, an internal passenger compartment air heating device.

6. The assembly according to claim 1, wherein said external environment is the environment of a combustion engine:

that is from time to time hotter than the second phase change temperature phase,
and with which the second phase change material is disposed in a heat exchange relationship,
to thus promote a liquefaction of said second phase change material.

7. The assembly according to claim 1, wherein the first phase change material and the second phase change material are dispersed in a matrix or disposed in several layers of material each containing one of said first phase change material and second phase change material.

8. The assembly according to claim 1, wherein said internal volume encloses, as of said means for supplying thermal energy, an engine of a vehicle encapsulated by the thermal barrier, within said internal volume.

9. A vehicle comprising:
an passenger compartment,
an air conditioning device in fluid communication with the passenger compartment, and adapted to provide air conditioning to the passenger compartment,
the assembly according to claim 1,
  wherein said means for supplying to the internal volume and/or said element said thermal energy comprise the air conditioning device,
  wherein the internal volume includes the passenger compartment, and,
  wherein the vehicle is disposed in said external environment which the passenger compartment is separated from by the thermal barrier.

10. A vehicle including a passenger compartment, air conditioning means for providing air-conditioning to the passenger compartment, and an assembly, the assembly comprising:
a volume surrounded by a wall provided with a thermal barrier which surrounds said volume, the thermal barrier being suitable for helping to maintain, within said volume, and/or with respect to an element that is disposed in the volume, a temperature within a predetermined range while the vehicle is exposed to an external environment subjected to a non-constant temperature, the thermal barrier comprising from inside, where said volume is located, toward outside where said external environment is located:
  a phase change material that stores or releases thermal energy through a change of phase and having a phase change temperature, then,
  a thermally insulating component disposed outside said phase change material; and
means for temporarily supplying to said volume and/or the phase change material a thermal energy, to thus promote the phase change of said phase change material,
wherein said means for temporarily supplying thermal energy provides the thermal energy at a temperature that is periodically hotter than the temperature of the change of phase, of said phase change material, and
wherein said means for temporarily supplying thermal energy comprise air conditioning means or an electric battery.

11. A vehicle comprising:
an passenger compartment,
an air conditioning device in fluid communication with the passenger compartment, and adapted to provide air conditioning to the passenger compartment,
the assembly according to claim 10,
  wherein said means for supplying said thermal energy comprise the electric battery which provide said thermal energy to the phase change material,
  wherein the internal volume includes the passenger compartment, and,
  wherein the vehicle is disposed in said external environment which the passenger compartment is separated from by the thermal barrier.

\* \* \* \* \*